United States Patent [19]
Park et al.

[11] Patent Number: 5,799,496
[45] Date of Patent: Sep. 1, 1998

[54] TEMPERATURE CONTROLLING METHOD AND APPARATUS FOR REFRIGERATOR USING VELOCITY CONTROL OF VENTILATION FAN AND DIRECTION CONTROL OF ROTARY BLADE

[75] Inventors: Hae-jin Park; Yun-seok Kang, both of Suwon, Rep. of Korea

[73] Assignee: Samsung Electronics Co., Ltd., Kyungki-do, Rep. of Korea

[21] Appl. No.: 839,098

[22] Filed: Apr. 23, 1997

[30] Foreign Application Priority Data

Apr. 29, 1996 [KR] Rep. of Korea ............... 1996-13554

[51] Int. Cl.$^6$ ........................................... F25D 17/06
[52] U.S. Cl. ........................ 62/89; 62/186; 62/408
[58] Field of Search ...................... 62/179, 180, 177, 62/178, 186, 187, 89, 404, 407, 408, 413, 414; 236/49.3, 51; 454/256, 258

[56] References Cited

U.S. PATENT DOCUMENTS

| | | | |
|---|---|---|---|
| 4,671,458 | 6/1987 | Fukuda et al. | 236/49.3 |
| 5,251,814 | 10/1993 | Warashina et al. | 62/186 X |
| 5,331,825 | 7/1994 | Kim | 62/180 |
| 5,678,413 | 10/1997 | Jeong et al. | 62/186 X |
| 5,687,580 | 11/1997 | Jeong et al. | 62/408 X |
| 5,692,383 | 12/1997 | Jeong et al. | 62/89 |

*Primary Examiner*—Harry B. Tanner
*Attorney, Agent, or Firm*—Burns, Doane, Swecker and Mathis LLP

[57] ABSTRACT

A temperature controlling method and apparatus for a refrigerator are provided, in which a temperature-equilibrating position into which cool air is to be discharged is calculated based on a fuzzy model and learning of a neural network, using the change in temperatures measured by only a small number of temperature sensors at a predetermined number of portions within a refrigeration compartment, and then the rotation velocity of a ventilation fan and a stop angle of a rotary blade are controlled according to the calculated temperature-equilibrating position. As a result, the cool air is appropriately discharged into each portion according to the distance between the rotary blade and a target position, so that the optimal temperature equilibrium is obtained in the refrigeration compartment.

15 Claims, 9 Drawing Sheets

TEMPERATURE CONTROLLING METHOD AND APPARATUS FOR REFRIGERATOR USING VELOCITY CONTROL OF VENTILATION FAN AND DIRECTION CONTROL OF ROTARY BLADE

BACKGROUND OF THE INVENTION

The present invention relates to a temperature controlling method and apparatus for a refrigerator for evenly distributing a desired temperature within a refrigeration compartment, and more particularly, to a temperature controlling method and apparatus for a refrigerator in which cool air is distributed with respect to the distance from a rotary blade in the refrigeration compartment by controlling a velocity of a refrigeration ventilation fan (R-fan) and a direction of the rotary blade according to a fuzzy inference and the learning by a neural network.

Generally, since the load of the items being refrigerated is different at different portions of the refrigeration compartment in a refrigerator, particularly, in a large refrigerator, it is difficult to maintain an even temperature within the refrigeration compartment. Accordingly, research into a method for evenly distributing the temperature of the refrigeration compartment has been performed with the increase in the storage capacity inside the refrigerator. In one such method, the discharge of cool air is controlled by direction of a rotary blade attached to the rear wall of the refrigeration compartment. Here, cool air is discharged into a high-temperature region to even out the temperature within the refrigeration compartment. The rotary blade determines the cool air discharge direction by a predetermined stop angle thereof during the rotation. A ventilation fan rotates at a predetermined velocity to discharge cool air into the refrigeration compartment.

However, since the ventilation force by the rotation of the ventilation fan is constant in a refrigerator having the rotary blade and the ventilation fan, the discharge of cool air cannot be controlled according to the distance from the rotary blade to a target area to be cooled. In other words, when intending to discharge cool air to a front position of the refrigeration compartment, far from the rotary blade, the rotation velocity of the ventilation fan should be increased to discharge the cool air into the front position. Meanwhile, when intending to discharge cool air to a rear position of the refrigeration compartment, near the rotary blade, the cool air discharging velocity should be reduced by rotating the ventilation fan at a low velocity or stopping the rotation of the ventilation fan altogether. However, the conventional ventilation fan cannot appropriately control the cool air discharging velocity due to the constant rotation velocity thereof.

Also, as a precondition for controlling the cool air discharging velocity through the control of the rotation velocity of the ventilation fan, temperatures of each portion should be precisely measured according to the distance from the rotary blade to each portion. However, in the conventional refrigerator having only two temperature sensors positioned at upper and lower portions of the refrigeration compartment, respectively, it is difficult to precisely measure the temperatures of each portion. Also, even though the temperatures of each portion are inferred by the fuzzy inference to some degree of accuracy, the conventional refrigerator cannot correct specific errors of every product, which may occur during the mass production thereof, so that there are limitations to the accuracy of the inference.

SUMMARY OF THE INVENTION

It is an object of the present invention to provide a temperature controlling method and apparatus for a refrigerator in which temperatures of each portion within a refrigeration compartment are precisely inferred using a small number of temperature sensors, and a rotation velocity of a ventilation fan and a direction of a rotary blade are controlled according to the identified highest-temperature portion, so that cool air is evenly discharged according to the distance and the direction within the refrigeration compartment.

According to an aspect of the present invention, there is provided a temperature controlling method for a refrigerator comprising the steps of: (a) detecting a temperature-equilibrating position as the highest temperature position within a refrigeration compartment; (b) controlling the rotation velocity of a ventilation fan to a temperature-equilibrating velocity required for ventilating cool air from a rotary blade to the temperature-equilibrating position; and (c) controlling the stop angle of the rotary blade to orientate the cool air toward the temperature-equilibrating position.

Preferably, the step (a) comprises the steps of: (a-1) constructing a fuzzy model for inferring the temperature-equilibrating position according to the Takagi-Sugeno-Kang (TSK) fuzzy inference; (a-2) correcting the temperature-equilibrating position inferred in the step (a-1) through the learning of a neural network. Also, the step (a-1) may comprise the steps of: (a-1-1) obtaining data representing the changes in temperature in a plurality of portions, separated from the rotary blade by different distances at each different stop angles of the rotary blade, within the refrigeration compartment, measured by temperature sensors; (a-1-2) performing a fuzzy division based on the measured temperature data; (a-1-3) selecting the optimum structure among each structure obtained through the fuzzy division; and (a-1-4) calculating a linear formula for inferring the temperature-equilibrating position based on the optimum structure.

Preferably, the step (a-2) comprises the steps of: (a-2-1) constituting the neural network taking the values of the measured temperature data at its input nodes and outputting the temperature-equilibrating position at its output node; (a-2-2) performing learning of the neural network using the values of the temperature data and the temperature-equilibrating position output in the step (a-2-1); and (a-2-3) correcting the inferred temperature-equilibrating position by comparing the values of the temperature data with the temperature-equilibrating position obtained through the learning of the neural network. Also, the step (a-2-2) may comprise the step of: reflecting the difference between a temperature-equilibrating velocity calculated from the inferred temperature-equilibrating position and a real temperature-equilibrating velocity with respect to the same input values to the neural network.

Preferably, the step (b) comprises the steps of: (b-1) generating an AC voltage having an effective voltage value corresponding to the maximum rotation velocity of the ventilation fan; (b-2) calculating an equilibrium voltage having an effective voltage value required for rotating the ventilation fan with a rotation velocity corresponding to the temperature-equilibrating velocity; (b-3) cutting the waveform of the AC voltage by a predetermined duration to generate the equilibrium voltage; and (b-4) applying the equilibrium voltage to a driving motor for driving the ventilation fan. Also, the step (b-1) may comprise the steps of: (b-1-1) detecting the real rotation velocity of the ventilation fan;(b-1-2) calculating the difference between the detected rotation velocity of the ventilation fan and the temperature-equilibrating velocity; and (b-1-3) calculating an effective voltage value corresponding to the temperature-equilibrating velocity by adding or subtracting an effective voltage value corresponding to the velocity difference to or from the effective voltage value corresponding to the detected rotation velocity of the ventilation fan.

Preferably, the step (b-3) comprises the steps of: (b-3-1) detecting a zero crossing point from the waveform of the AC voltage; (b-3-2) calculating a delay time from the zero crossing point, corresponding to an effective voltage value obtained by subtracting the effective voltage value corresponding to the temperature-equilibrating velocity from the effective voltage value of the AC voltage waveform; and (b-3-3) cutting the waveform during the delay time calculated in the step (b-3-2) from the zero crossing point.

Preferably, the step (c) may comprise the steps of: (c-1) detecting the stop angle of the rotary blade; (c-2) calculating the difference between the stop angle of the rotary blade and the inferred temperature-equilibrating angle; and (c-3) tuning the stop angle of the rotary blade by reflecting the difference calculated in the step (c-2) to the detected stop angle of the rotary blade.

According to another aspect of the present invention, there is provided a temperature controlling apparatus for a refrigerator having a rotary blade, at least one evaporator, and at least two ventilation fans each of which is installed in a freezer compartment and a refrigeration compartment, the temperature controlling apparatus comprising: means for sensing change in temperatures at a predetermined number of portions within the refrigeration compartment; means for performing a fuzzy inference according to the temperature changes sensed by the temperature sensing means to infer a temperature-equilibrating position corresponding to the highest temperature position; neural network calculating means for calculating the temperature-equilibrating position by taking the temperature change values sensed by the temperature sensing means at its input nodes, and outputting the calculated temperature-equilibrating position at its output node; means for performing learning of the neural network by reflecting the difference between a temperature-equilibrating velocity of the refrigeration ventilation fan (R-fan), required for discharging the cool air to the temperature-equilibrating position, and the real rotation velocity of the R-fan, into the neural network calculating means; a rotation velocity controller for controlling the rotation velocity of the R-fan according to the temperature-equilibrating velocity; and a stop angle controller for controlling a stop angle of the rotary blade to the temperature-equilibrating angle for discharging the cool air into the temperature-equilibrating position.

Preferably, the rotation velocity controller comprises: a power source for providing an AC voltage having an effective value corresponding to the maximum rotation velocity of the R-fan; an temperature-equilibrium voltage generator for generating a temperature-equilibrium voltage having an effective voltage value corresponding to the temperature-equilibrating velocity by cutting the AC voltage by a predetermined duration; and a driving motor for driving the R-fan according to the temperature-equilibrium voltage.

Preferably, the temperature-equilibrium voltage generator comprises: a zero crossing point detector for detecting a zero crossing point from the AC voltage; a delay time calculator for calculating a delay time from the zero crossing point to generate the temperature-equilibrium voltage; and waveform cutting means for cutting the waveform of the AC voltage from the zero crossing point during the delay time.

Preferably, the waveform cutting means comprises: a TRIAC connected to the power source together with the driving motor; and trigger means for providing a trigger signal to a gate port of the TRIAC after a lapse of time corresponding to the cut duration.

Preferably, the rotation velocity controller comprises: means for detecting the rotation velocity of the R-fan; and means for calculating the difference between the detected rotation velocity of the R-fan and the inferred temperature-equilibrating velocity, wherein a temperature-equilibrating velocity is obtained by reflecting the calculated velocity difference to the inferred temperature-equilibrating velocity, and the rotation velocity of the R-fan is controlled to the obtained temperature-equilibrating velocity.

Preferably, the stop angle controller comprises: means for detecting the stop angle of the rotary blade; and means for calculating the difference between the detected stop angle of the rotary blade and the inferred temperature-equilibrating angle, wherein a temperature-equilibrating angle is obtained by reflecting the calculated stop angle difference to the detected stop angle, and the stop angle of the rotary blade is controlled to the obtained temperature-equilibrating angle.

BRIEF DESCRIPTION OF THE DRAWINGS

The above object and advantages of the present invention will become more apparent by describing in detail a preferred embodiment thereof with reference to the attached drawings in which.

DETAILED DESCRIPTION OF THE INVENTION

Figure 1:
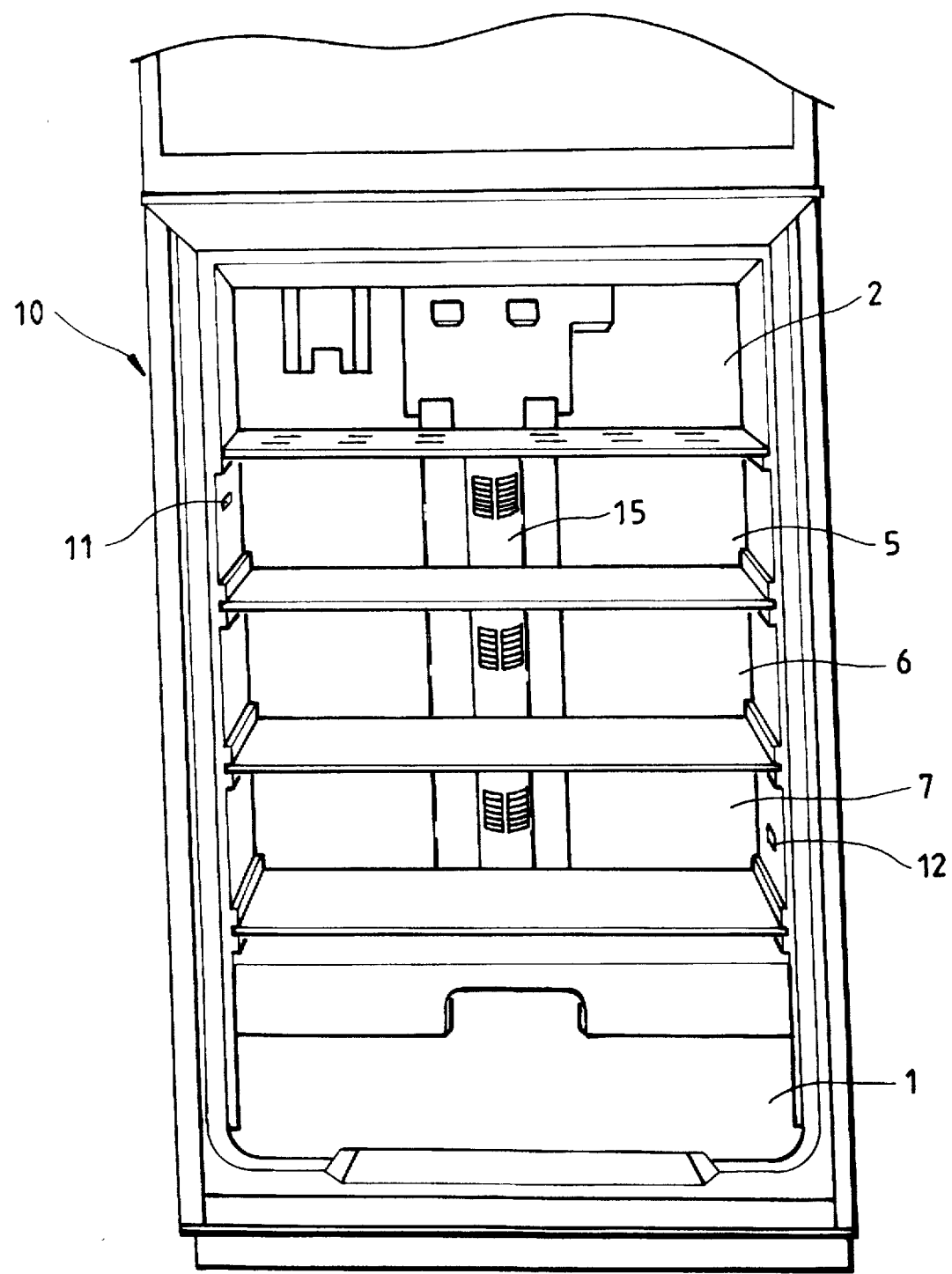
FIG. 1 is a perspective view showing the inside of a refrigerator having a temperature controlling apparatus according to present invention.

As shown in FIG. 1, a refrigeration compartment 10 of a refrigerator is generally located at the lower portion of the refrigerator. The refrigeration compartment 10 is partitioned and the lowermost portion of the partitioned refrigeration compartment 10 is used as a crisper 1. Generally, the refrigeration compartment 10, beside of the crisper 1, is partitioned into four portions, wherein an uppermost portion 2 is generally called a fresh compartment. Here, the remaining portions will be called first, second and third portions 5, 6 and 7 from the top down. Also, considering that the height of the refrigeration compartment 10 except the crisper 1 and the uppermost portion 2 is "H", the first, second and third portions 5, 6 and 7 are at 3H/4, 1H/2 and 1H/3, respectively. Two temperature sensors are placed in the refrigerator compartment 10, wherein a temperature sensor 11 for sensing the temperature of the upper left portion of the refrigeration compartment 10 is attached at the left wall of the first portion 5 and a temperature sensor 12 for sensing the temperature of the lower right portion of the refrigeration compartment 10 is attached at the right wall of the third portion 7. In addition, a cool air discharging portion 15 is at the center of the rear wall of the refrigeration compartment 10. Here, the discharge of cool air from the cool air discharging portion 15 is controlled by a rotary blade 20 shown in FIG. 3.

Figure 2:
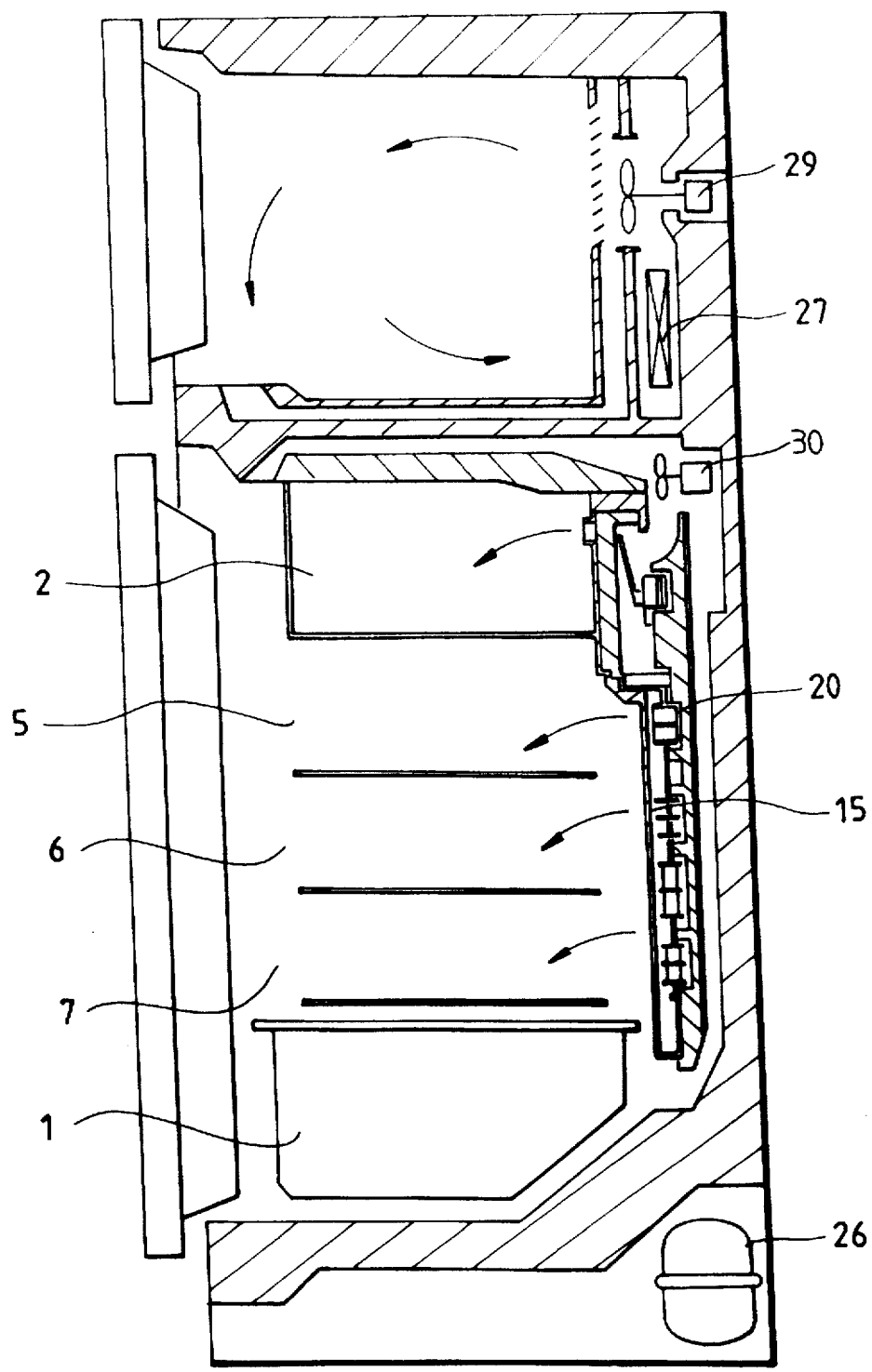
FIG. 2 is a vertical section view of the refrigerator shown in FIG. 1.

FIG. 2 shows the location of a ventilation fan (R-fan) 30 and the rotary blade 20 installed in the cool air discharging portion 15. Here, reference numerals 27 and 29 represent an evaporator and the ventilation fan (F-fan) in a freezer compartment, respectively. The remaining elements designated by the same reference numerals represents the same elements as those of FIG. 1. Also, the ventilation fan 30 is installed with the rotary blade 20 at the rear wall of the refrigeration compartment 10. The discharge velocity of the cool air, from the rotary blade 20 into portions 5, 6 and 7, is controlled according to the rotation velocity of the ventilation fan 30.

Figure 3:
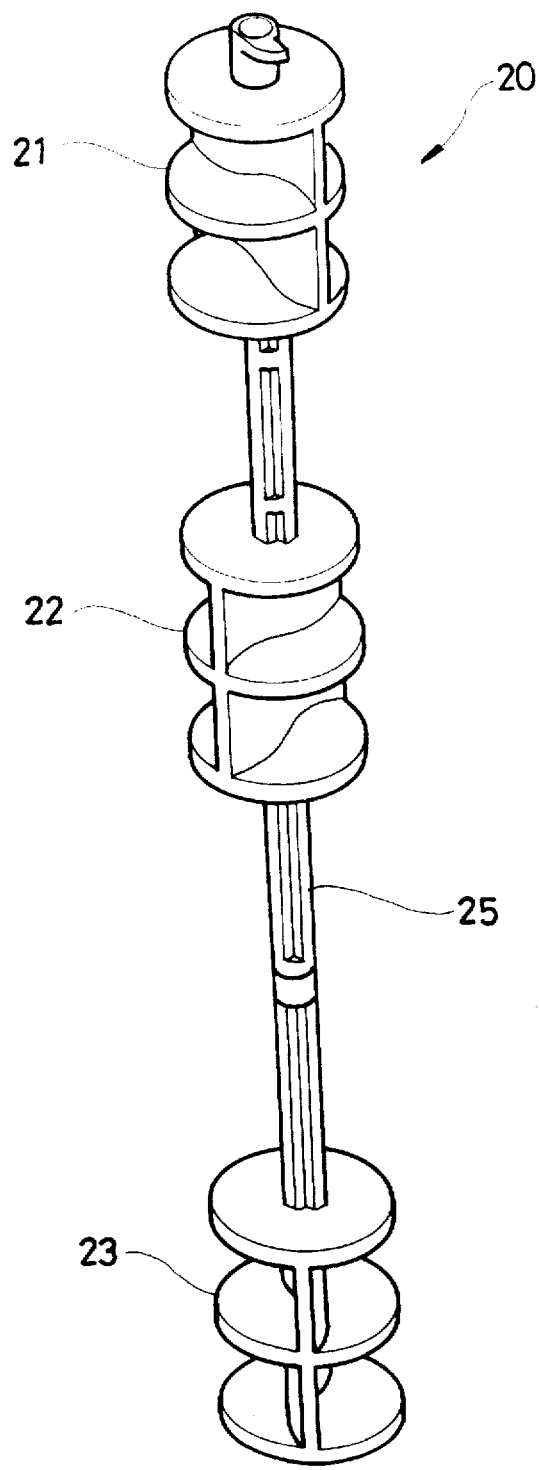
FIG. 3 is an enlarged perspective view of the rotary blade shown in FIG. 2.

FIG. 3 is an enlarged perspective view of the rotary blade 20. Referring to FIG. 3, the rotary blade 20 includes an upper blade 21, a middle blade 22 and a lower blade 23, corresponding to the first, second and third portions 5, 6 and 7, respectively. The upper, middle and lower blades 21, 22 and 23 rotate integrally centered around a rotary shaft 25. The upper, middle and lower blades 21, 22 and 23 are displaced from each other by 60°, directing cool air at different directions.

The rotary blade 20 forward/backward rotates along a path indicated by an arrow of FIG. 3. Here, the rotation angle of the rotary blade 20 is defined as "stop angle (θ)" thereof. Since each blade 21, 22 and 23 is disposed at different angles, the cool air can be discharged into different directions during the rotation of the rotary blade 20.

Figure 4:
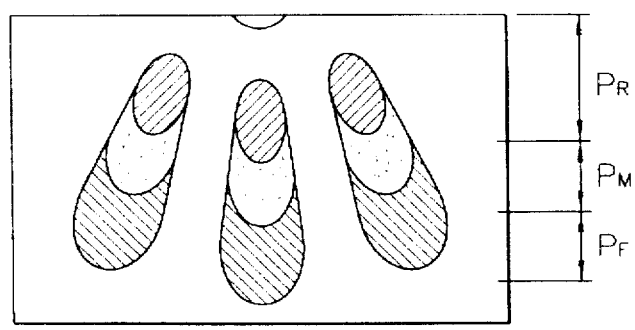
FIG. 4 is a schematical cross-section view illustrating the discharge of cool air into regions of a refrigeration compartment, which are separated from the rotary blade by different distances, according to the rotation velocity of the ventilation fan and the stop angle of the rotary blade.
Figure 5:
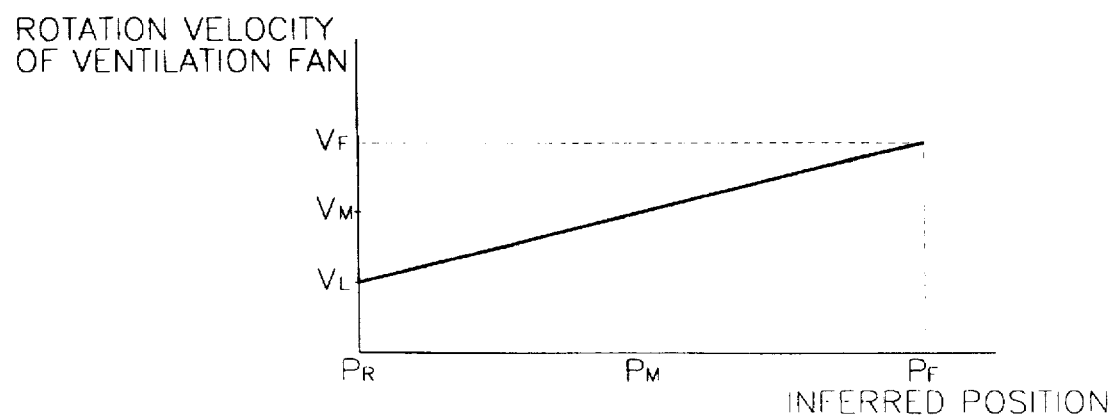
FIG. 5 is a graph showing the rotation velocity of the ventilation fan to the inferred position in refrigeration compartment.

FIG. 4 is a cross-sectional view illustrating the discharge of cool air into portions of a refrigeration compartment with respect to the distance from the rotary blade according to the rotation velocity of the ventilation fan and the direction of the rotary blade. FIG. 5 is a graph showing the rotation velocity of the ventilation fan 30 to the inferred the highest temperature position.

The cool air discharging direction is controlled to the left, the center and the right according to the stop angle (θ) of the rotary blade 20 (see FIG. 3). It is desirable that the stop angle is controlled to be continuous values according to the temperature distribution in the refrigeration compartment 10. However, the stop angle (θ) of the rotary blade is actually controlled to have a plurality of angles (about five) without continuity.

When the ventilation fan 30 (see FIG. 2) rotates rapidly, the cool air is discharged to a front portion of the refrigeration compartment 10 which is far from the rotary blade. On the contrary, the cool air is discharged to a rear portion of the refrigeration compartment 10 which is near the rotary blade 20 when the ventilation fan 30 rotates slowly.

In FIG. 4, $P_R$ represents the rear position of the refrigeration compartment 10 which is near the rotary blade 20, $P_F$ represents a front position of the refrigeration compartment 10 which is far from the rotary blade 20, and $P_M$ represents a middle position between the rear and front positions. In FIG. 5, cool air is discharged to position $P_R$ when the ventilation fan 30 rotates at a low velocity $V_L$, cool air is discharged to position $P_M$ when the ventilation fan 30 rotates at a middle velocity $V_M$, and cool air is discharged to position $P_F$ when the ventilation fan 30 rotates at a high velocity $V_H$. The rotation velocity of the ventilation fan 30 is controlled to not have a discontinuous value. That is, the rotation velocity of the ventilation fan 30 is controlled such that cool air reaches a portion which is inferred as the highest-temperature portion, so that the controlled rotation velocity has continuity between the maximum rotation velocity and the minimum rotation velocity.

According to the present invention, the temperatures of each portion of the refrigeration compartment are inferred and then a learning is performed based on the data of the inferred temperature to discharge cool air into the highest temperature portion, thereby maintaining an even temperature throughout the refrigeration compartment. The present invention can be achieved by the following three steps.

First, temperatures of a plurality of portions in the refrigeration compartment 10, which are separated from the rotary blade 20 by different distances, are inferred using the temperatures detected by two temperature sensors 11 and 12 according to the fuzzy inference based on the Takagi-Sugeno-Kang (TSK) fuzzy model.

Second, positions corresponding to the temperatures inferred by the fuzzy model are corrected by a neural network to more accurately calculate the positions to be cooled. That is, the neural network is constructed by taking the temperature values sensed by the two temperature sensors 11 and 12 as input nodes and the highest temperature position (hereinafter referred to as "temperature-equilibrating position") within the refrigeration compartment 10 as an output node. Then, the temperature-equilibrating position is compared with the inferred position by means of learning by the neural network, thereby more accurately calculating the temperature-equilibrating position.

Third, the rotation velocity of the ventilation fan 30 and the stop angle (θ) of the rotary blade 20 are controlled to discharge cool air into the calculated temperature-equilibrating position. The waveform of the voltage applied to a driving motor (not shown) for driving the ventilation fan 30 is partly cut off for a predetermined duration to reduce the effective value of the voltage, thereby slowing down the rotation velocity of the ventilation fan 30.

Hereinafter, the above three steps will be described in detail.

First, the TSK fuzzy model in the fuzzy inference step will be described as follows.

For the fuzzy inference, a plurality of data with respect to a plurality of variables are required. Examples of the own in Table 1.

TABLE 1

| No. | X1 | X2 | X3 | Y | No. | X1 | X2 | X3 | Y |
|---|---|---|---|---|---|---|---|---|---|
| 1 | 1 | 3 | 1 | 11.11 | 21 | 1 | 1 | 5 | 9.545 |
| 2 | 1 | 5 | 2 | 6.521 | 22 | 1 | 3 | 4 | 6.043 |
| 3 | 1 | 1 | 3 | 10.19 | 23 | 1 | 5 | 3 | 5.724 |
| 4 | 1 | 3 | 4 | 6.043 | 24 | 1 | 1 | 2 | 11.25 |
| 5 | 1 | 5 | 5 | 5.242 | 25 | 1 | 3 | 1 | 11.11 |
| 6 | 5 | 1 | 4 | 19.02 | 26 | 5 | 5 | 2 | 14.36 |
| 7 | 5 | 3 | 3 | 14.15 | 27 | 5 | 1 | 3 | 19.61 |
| 8 | 5 | 5 | 2 | 14.36 | 28 | 5 | 3 | 4 | 13.65 |
| 9 | 5 | 1 | 1 | 27.42 | 29 | 5 | 5 | 5 | 12.43 |
| 10 | 5 | 3 | 2 | 15.39 | 30 | 5 | 1 | 4 | 19.02 |
| 11 | 1 | 5 | 3 | 5.724 | 31 | 1 | 3 | 3 | 6.38 |
| 12 | 1 | 1 | 4 | 9.766 | 32 | 1 | 5 | 2 | 6.521 |
| 13 | 1 | 3 | 5 | 5.87 | 33 | 1 | 1 | 1 | 16 |
| 14 | 1 | 5 | 4 | 5.406 | 34 | 1 | 3 | 2 | 7.219 |
| 15 | 5 | 1 | 3 | 10.19 | 35 | 1 | 5 | 3 | 5.724 |
| 16 | 5 | 3 | 2 | 15.39 | 36 | 5 | 1 | 4 | 19.02 |
| 17 | 5 | 5 | 1 | 19.68 | 37 | 5 | 3 | 5 | 13.39 |
| 18 | 5 | 1 | 2 | 21.06 | 38 | 5 | 5 | 4 | 12.68 |
| 19 | 5 | 3 | 3 | 14.15 | 39 | 5 | 1 | 3 | 19.61 |
| 20 | | 5 | 4 | 12.68 | 40 | 5 | 3 | 2 | 15.39 |

In Table 1, there are three input variables X1, X2 and X3 and an output variable Y, wherein the numerical relation between the input variables and the output variable are obtained by a real measurement. The ultimate object of the TSK fuzzy inference is to express a linear relationship between the input variables and the output variable with a numerical formula using the plurality of measured values. Thus, a linear formula expressing the relationship between the input and output variables is expressed as follows, which is called "conclusion part" of the fuzzy inference:

$$Y = a_0 + a_1 X1 + a_2 X2 + a_3 X3 + a_4 X4 \quad (1)$$

As shown in Table 1, the output values according to changes in the input variables are different according to the degree of contribution of each input variable to the entire output value, and the degree of the contribution of the input values is expressed as coefficients $a_1$, $a_2$, $a_3$ and $a_4$, respectively.

Hereinafter, the fuzzy inference step will be described by stage.

STAGE 1

First, a linear formula representing the relationship between the input and output variables is obtained using the data shown in Table 1. Here, a minimum square method for the numerical analysis is used and the variables having a smaller degree of contribution are considered to be the minimum using a variable decreasing method based on an error rate, thereby resulting in the following formula (2).

$$Y = 15.3 + 1.97 X1 - 1.35 X2 - 1.57 X3 \quad (2)$$

The formula (2) is similar to the above formula (1), however, the formula (2) is a base formula, and not final, for constructing the fuzzy model for the fuzzy inference. The data area is divided on the basis of a variable having the highest degree of contribution based on the formula (2), resulting in the optimal linear formula in which the degree of contribution of each variable is appropriately expressed. As shown in the formula (2), the input variable X4 is eliminated from the above formula (2) according to an algorithum based on the variable decreasing method.

As a method for modeling the relationship between the input and output variables of a nonlinear system into a polynomial expression with respect to the input variables, an unbiasedness criterion (UC) is applied to the formula (2). To obtain the value of UC, the entire data is divided into two groups A and B and then substituted for the variables of the following formula (3).

$$UC = \left[ \sum_{i=1}^{n_A} (y_i^{AB} - y_i^{AA})^2 + \sum_{i=1}^{n_B} (y_i^{BA} - y_i^{BB})^2 \right]^{\frac{1}{2}} \quad (3)$$

where $n_A$ represents the number of data in group A, $n_B$ represents the number of data in group B, $Y_i^{AA}$ represents an output estimated from group A by the fuzzy model which is obtained by group A, $Y_i^{AB}$ represents an output estimated from group A by the fuzzy model which is obtained by group B, $Y_i^{BB}$ represents an output estimated from group B by the fuzzy model which is obtained by group B, $Y_i^{BA}$ represents an output estimated from group B by the fuzzy model which is obtained by group A, the first term represents the difference between the estimated outputs between the groups A and B with respect to the input data of the group A, and the second term represents the difference between the estimated outputs between the groups A and B with respect to the input data of the group B. The UC obtained from the above is called UC(1). The UC obtained from the data shown in Table 1 is as follows.

$$UC(1) = 3.8 \quad (4)$$

STAGE 2

A fuzzy model accompanying two plant rules is established. Here, the structure of a precondition part corresponding to the "if" part of the "if-then" rule of the fuzzy model should be established. In the establishment of the structure, the selection of variables and fuzzy division are considered simultaneously.

First, a structure having one of variables X1, X2 and X3 as a variable of the precondition part is premised and the data area is divided into two. Thus, four structures are considered for the precondition part.

For example, the first structure has a fuzzy model accompanying the following two plant rules:

L1: if X1=SMALL, then $Y_{11} = -2.91 + 1.21 X1 - 2.65 X2 + 1.89 X3$

L2: if X1=BIG, then $Y_{12} = 1.11 + 1.29 X1 + 1.81 X2 + 2.23 X3$.

Also, the second structure has a fuzzy model accompanying the following two plant rules:

L1: if X2=SMALL, then $Y_{11} = 0.89 + 1.56 X1 + 1.09 X2 + 2.14 X3$

L2: if X2=BIG, then $Y_{12} = 5.14 + 1.77 X1 + 1.96 X2 + 1.22 X3$.

The parameters for the precondition part having the above structure are established, and then a structure and parameters of the conclusion part are established based on the established precondition part. The UC values for the above four structures can be calculated as follows.

$UC(2-1) = 5.4$ $UC(2-2) = 3.5$ $UC(2-3) = 3.3$ $UC(2-4) = 4.6$ where the first numeral inside the parenthesis means a fuzzy division-into-two, and the second numeral represents the index of the variable. For example, UC(2-4) indicates the UC value when the fuzzy division-into-two is performed on the basis of the variable X4.

Comparing the above four UC values, UC(2-3) is the smallest, so that a fuzzy model is constructed on the basis of the variable X3 as follows.

L1: If X3=SMALL
then Y1=3.13X1−1.91X2+13.6X3

L2: If X3=BIG
then Y2=8.92+1.84X1−1.32X2+0.14X3

STAGE 3

Since the variable X3 is included in the precondition part of the STAGE 2, a fuzzy division-into-three is performed on the basis of the variable X3. That is, the variable having the least UC value in the STAGE 2 is preferentially added to the fuzzy division-into-three. Accordingly, the fuzzy division-into-three is performed on the basis of the variable X3.

Figure 6A:
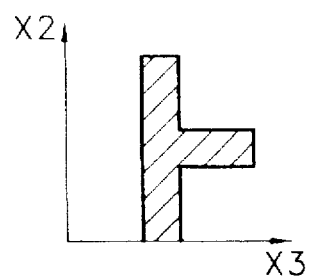
FIGS. 6A, 6B and 6C are graphs each showing the divided structure when the data shown in Table 1 is fuzzy-divided into three.
Figure 6B:
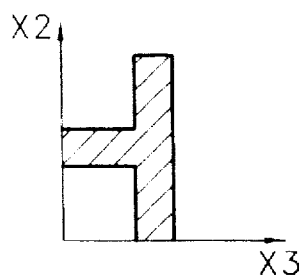
Figure 6C:
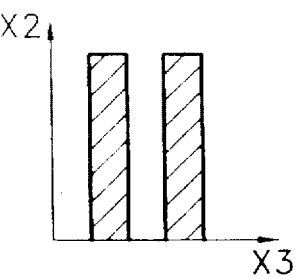
Figure 7:
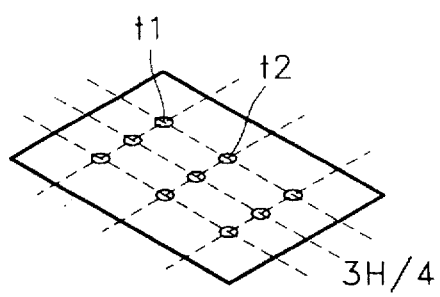
FIG. 7 is a schematic perspective view showing the positions on respective planes where temperatures are to be measured.
Figure 7:
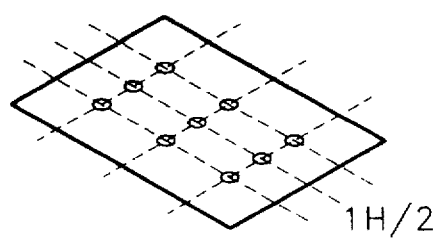
Figure 7:
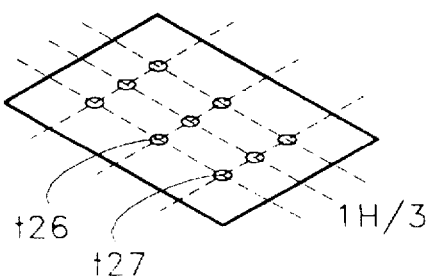

Three structures as shown in FIGS. 6A to 6C can be considered for the structures of the divided data area of the precondition part. For example, the third structure (see FIG. 6C) is as follows.

L1: if X3=SMALL, then Y=5.96+4.12X1−2.95X2+1.25X3

L2: if X3=MEDIUM, then Y=6.77+5.12X1−3.96X2+2.25X3

L3: if X3=BIG, then Y=2.77+3.12X1−2.97X2+3.25X3

The data structure of the precondition part and parameters of the conclusion part are established with respect to the above three structures, and then the UC values can be calculated. As a result, it can be shown that the first structure has the least UC value. Thus, a fuzzy model is constructed on the basis of the first structure as follows.

L1: If X3=SMALL
then Y1=20.5+3.3X1−1.85X2−4.98X3

L2 If X3=BIG and X2=SMALL
then Y2=12.7+2.98X1−0.56X3

L3: If X3=BIG and X2=LARGE
then Y3=7.1+1.82X1−0.34X2−0.42X3

The above data division structure is a fuzzy model for the STAGE 3.

STAGE 4

The above fuzzy division and calculation of the UC values with respect to each division structure are repeated. This repetition is performed until the least UC value is obtained. When the least UC value is obtained, the corresponding structure is selected as the optimal structure, and then a formula for the conclusion part is obtained. Thus, it is regarded that the obtained formula of the conclusion part reflects the degree of contribution of each variable at the optimum level.

Hereinafter, in the present invention, a process for obtaining a linear formula from the above conclusion part of the "if-then" rule will be described.

In order to obtain the fuzzy model for estimating the distribution of temperature within the refrigeration compartment using the temperatures measured by the temperature sensors 11 and 12 of FIG. 1, data reflecting the vertical and horizontal temperature distributions at various positions separated from the rotary blade by different distances in the refrigeration compartment is required.

Figure 8:
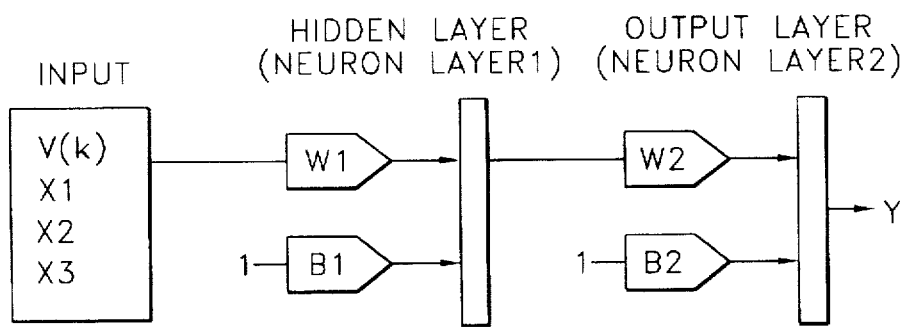
FIG. 8 is a schematic diagram showing the structure of a neural network according to the present invention.

FIG. 8 shows position where temperatures in the refrigeration compartment 10 (FIG. 1) are to be measured, wherein a total of 27 positions, nine (3×3) on each plane positioned at the heights of 3H/4, 1H/2 and 1H/3 from the bottom are shown. Here, the 27 positions are referred to as t1 through t27. First, the difference between the temperatures is measured by two temperature sensors 11 and 12, and changing values in the temperature differences at the 27 positions with lapse of time are recorded in a table. The obtained table is similar to the above Table 1. The table shows the temperature variation rate of the 27 positions with respect to the differences in temperatures measured by the temperature sensors 11 and 12, which is required to construct the fuzzy model for the fuzzy inference of the present invention.

Here, input variables X1, X2 and X3 are expressed as follows, which are temperature differences at the 27 positions (t1 through T27) with a lapse of time.

$$X1=S2(k)-S1(k)$$

$$X2=S2(k-1)-S1(k-1)$$

$$X3=S2(k-2)-S1(k-2)$$

where S1(k) and S2(k) are current temperature values measured by the temperature sensors 11 and 12, respectively, S1(k-1) and S2(k-1) are temperature values measured by the temperature sensors 11 and 12, respectively, 1 minute ago, and S1(k-2) and S2(k-2) are temperature values measured by the temperature sensors 11 and 12, respectively, 2 minutes ago. Thus, X1 indicates the difference in the current temperatures measured by the temperature sensors 11 and 12, X2 indicates the difference in the temperatures measured 1 minute ago by the temperature sensors 11 and 12, and X3 indicates the difference in the temperatures measured 2 minutes ago by the temperature sensors 11 and 12, respectively.

Also, an output variable is expressed as the highest temperature among temperatures measured at the 27 positions (t1 through t27) with respect to the input variables X1, X2 and X3. Thus, the data include the differences in temperatures measured by the temperature sensors 11 and 12 and the temperature difference variation rates at the 27 positions with a lapse of time.

The above-described TSK fuzzy theory is applied using the table. That is, the fuzzy division-into-two is performed with respect to respective variables and the fuzzy division-into-three is performed on the basis of a variable having the least UC value, so that a fuzzy structure having the least UC value is selected. Then, parameters of the precondition part with respect to the selected fuzzy structure are obtained and then an intended final linear formula is constructed according to the obtained parameters.

For the sake of explanation, the obtained final fuzzy structure is assumed as follows.

Here, the selected structure and numerical values are assumed in order to express the final formula. Thus, the final fuzzy structure and the numerical value of the formula according to its structure may be different according to experimental data.

L1: If X1=SMALL
then Y1=9.03+0.175X1−0.347X2+0.174X3

L2: If X1=MEDIUM
then Y2=9.43−2.6955X1+4.042X2−1.041X3

L3: If X1=BIG X2=SMALL
then Y3=−15.97+8.82X1−14.12X2+2.528X3

L4: If X1=BIG X2=BIG
then Y4=1.1−0.48X1+0.616X2−0.145X3

Here, it is assumed that the optimal structure is obtained by the fuzzy division-into-four, and Y1 through Y4 are linear formulae at each region of the fuzzy structure divided into four. The output Y' is calculated from the above fuzzy model as follows.

Wjem $g1 = -(|X1+6|-|X1-8|)/14,$ $g2 = -(|X1-6|-|X1-8|)/11,$ $W1[1] = 0.5(1+g1),$ $W1[2] = 0.5(-g1-g2),$ $W1[3] = 0.5(1+g2),$ $W2[1] = 0.5(1-|X2-2|-|X2-16|)/14,$ and $W2[2] = 1 - W2[1],$ $Y' = W1[1]Y1 + W1[2]W2[1]Y2 + W1[2]W2[1]Y3 + W1[3]Y4.$ Here, g1 and g2 represent membership functions of the first and second divided patterns of the above fuzzy model, and W represents a weight of the fuzzy inference, which is added to compensate for the contribution degree of each region with respect to the obtained formula according to a general theory of the TSK fuzzy model. The final output Y' represents a target position into which cool air is to be discharged for optimal temperature equilibrium.

Hereinafter, the second step of calculating a "temperature-equilibrating position" which indicates a target position into which cool air is discharged for the optimal temperature equilibrium is performed through the learning by the neural network.

The rotation velocity of the ventilation fan 30 during a subsequent sampling cycle is calculated from the values of previous and current temperatures sensed by the temperature sensors 11 and 12 and the previous rotation velocity of the ventilation fan 30. The neural network has four input nodes a1, a2, a3 and a4 and an output node Y. Here, a1 corresponds to the rotation velocity V(k) of the ventilation fan 30 during a sampling cycle, and a2, a3 and a4 correspond to the variables X1, X2 and X3 used for the fuzzy inference, respectively. Also, Y represents the temperature-equilibrating position obtained by correcting the position inferred from the fuzzy inference using the neural network.

Figure 9:
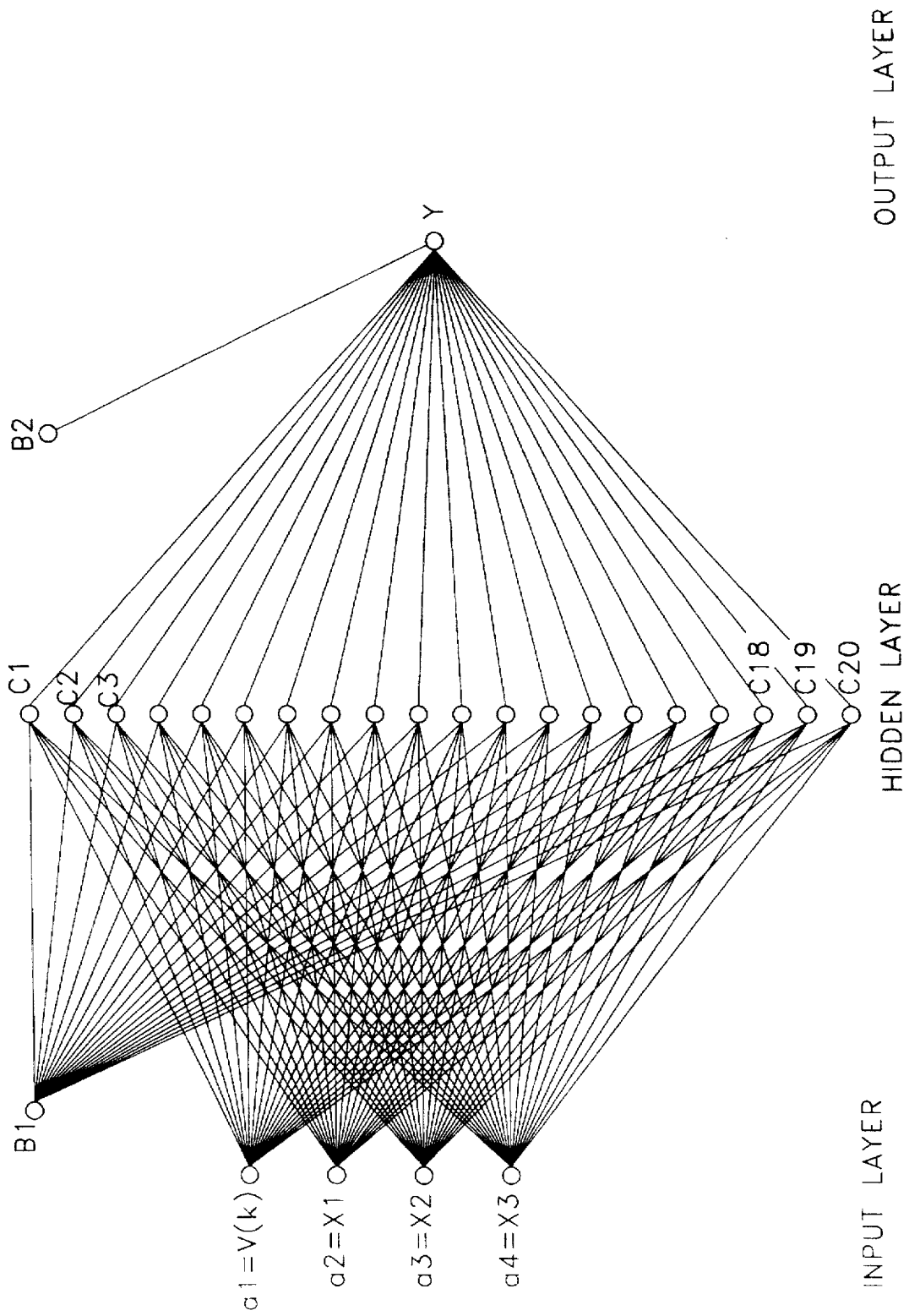
FIG. 9 shows the neural network of FIG. 8 in greater detail.

FIGS. 8 and 9 show the neural network having the above structure. In drawings, W1 represents a weight applied between an input layer and a hidden layer and W2 represents a weight applied between the hidden layer and an output layer. B1 and B2 represent biases respectively applied to the hidden layer and the output layer. In detail, B1 and B2 are constants input from the outside to increase the correctness of the learning, wherein the values of these constants are "1" in general. Here, the hidden layer is constituted of one layer and has twenty input nodes.

The learning of the neural network having the input nodes and output node is performed using the output value from the supervisor TSK fuzzy model, obtained from the first step, according to a back propagation method. Reference data of input nodes for the learning are values of input nodes a1, a2, a3 and a4 as measured values, and reference data of the output node is a difference value between the Y value and the Y' value, which is compared with the rotation velocity of the ventilation fan inferred from the fuzzy inference to reflect the degree of learning.

The relationship between the input nodes and the hidden nodes shown in FIG. 9 is as follows, obtained according to a general formula for the neural network.

$c_1 = W^1{}_1 a1 + W^2{}_1 a2 + W^3{}_1 a3 + W^4{}_1 a4 - b^1{}_1$ $c_2 = W^1{}_2 a1 + W^2{}_2 a2 + W^3{}_2 a3 + W^4{}_2 a4 - b^2{}_1$ $c_3 = W^1{}_3 a1 + W^2{}_3 a2 + W^3{}_3 a3 + W^4{}_3 a4 - b^3{}_1$ $c_4 = W^1{}_4 a1 + W^2{}_4 a2 + W^3{}_4 a3 + W^4{}_4 a4 - b^4{}_1$ $c_5 = W^1{}_5 a1 + W^2{}_5 a2 + W^3{}_5 a3 + W^4{}_5 a4 - b^5{}_1$ $c_6 = W^1{}_6 a1 + W^2{}_6 a2 + W^3{}_6 a3 + W^4{}_6 a4 - b^6{}_1$ $c_7 = W^1{}_7 a1 + W^2{}_7 a2 + W^3{}_7 a3 + W^4{}_7 a4 - b^7{}_1$ $c_8 = W^1{}_8 a1 + W^2{}_8 a2 + W^3{}_8 a3 + W^4{}_8 a4 - b^8{}_1$ $c_9 = W^1{}_9 a1 + W^2{}_9 a2 + W^3{}_9 a3 + W^4{}_9 a4 - b^9{}_1$ $c_{10} = W^1{}_{10} a1 + W^2{}_{10} a2 + W^3{}_{10} a3 + W^4{}_{10} a4 - b^{10}{}_1$ $c_{11} = W^1{}_{11} a1 + W^2{}_{11} a2 + W^3{}_{11} a3 + W^4{}_{11} a4 - b^{11}{}_1$ $c_{12} = W^1{}_{12} a1 + W^2{}_{12} a2 + W^3{}_{12} a3 + W^4{}_{12} a4 - b^{12}{}_1$ $c_{13} = W^1{}_{13} a1 + W^2{}_{13} a2 + W^3{}_{13} a3 + W^4{}_{13} a4 - b^{13}{}_1$ $c_{14} = W^1{}_{14} a1 + W^2{}_{14} a2 + W^3{}_{14} a3 + W^4{}_{14} a4 - b^{14}{}_1$ $c_{15} = W^1{}_{15} a1 + W^2{}_{15} a2 + W^3{}_{15} a3 + W^4{}_{14} a4 - b^{15}{}_1$ $c_{16} = W^1{}_{16} a1 + W^2{}_{16} a2 + W^3{}_{16} a3 + W^4{}_{16} a4 - b^{16}{}_1$ $c_{17} = W^1{}_{17} a1 + W^2{}_{17} a2 + W^3{}_{17} a3 + W^4{}_{17} a4 - b^{17}{}_1$ $c_{18} = W^1{}_{18} a1 + W^2{}_{18} a2 + W^3{}_{18} a3 + W^4{}_{18} a4 - b^{18}{}_1$ $c_{19} = W^1{}_{19} a1 + W^2{}_{19} a2 + W^3{}_{19} a3 + W^4{}_{19} a4 - b^{19}{}_1$ $c_{20} = W^1{}_{20} a1 + W^2{}_{20} a2 + W^3{}_{20} a3 + W^4{}_{20} a4 - b^{20}{}_1$

The relationship between the hidden nodes and the output node is as follows.

$$Y = w^1 c_1 + w^2 c_2 + w^3 c_3 + w^4 c_4 + w^5 c_5 +$$
$$w^6 c_6 + w^7 c_7 + w^8 c_8 + w^9 c_9 + w^{10} c_{10} +$$
$$w^{11} c_{11} + w^{12} c_{12} + w^{13} c_{13} + w^{14} c_{14} + w^{15} c_{15} +$$
$$w^{16} c_{16} + w^{17} c_{17} + w^{18} c_{18} + w^{19} c_{19} + w^{20} c_{20} - b_2$$

Hereinafter, the third step for controlling the rotation velocity of the ventilation fan 30 (see FIG. 2) and the stop angle (θ) of the rotary blade 20 according to the temperature-equilibrating position will be described.

Figure 10:
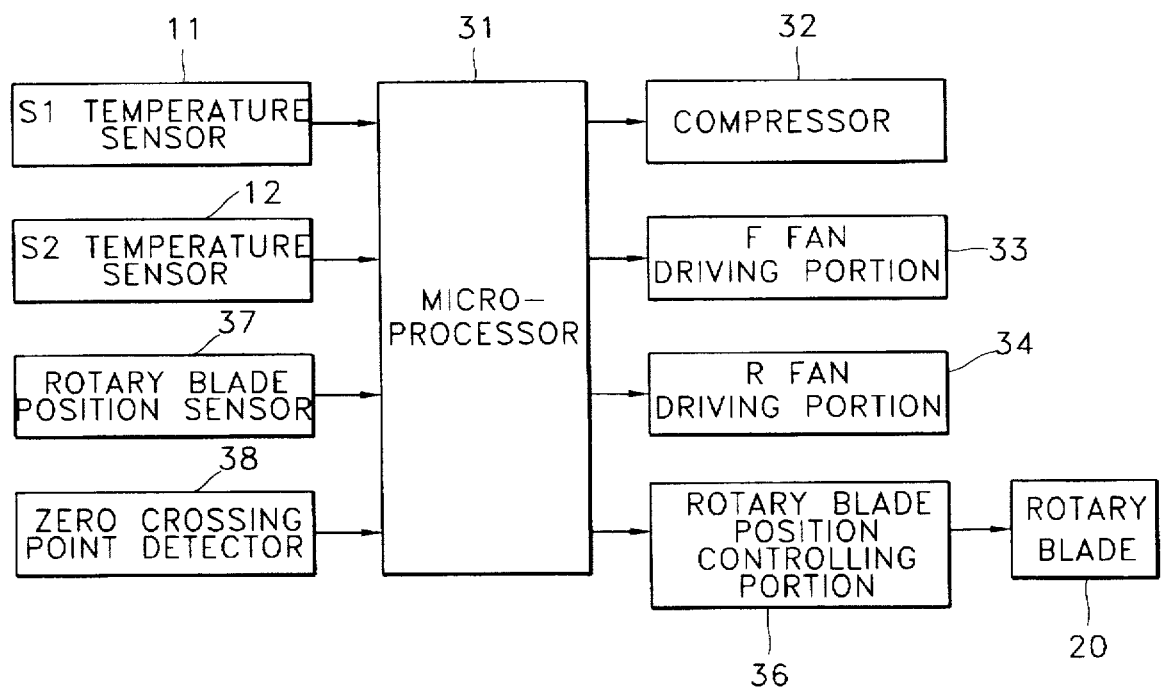
FIG. 10 is a block diagram of a temperature controlling apparatus according to the present invention.

FIG. 10 is a block diagram of a temperature controlling apparatus according to the present invention. The overall control in the refrigerator is performed by a microprocessor 31. S1 and S2 temperature sensors 11 and 12 sense the temperature within the refrigeration compartment to provide data of the changed temperatures which are required for the fuzzy inference. An F fan driving portion 33 and an R fan driving portion 34 are for driving cool air ventilation fans 29 and 30 (see FIG. 2) at a freezer compartment and refrigeration compartment, respectively. The microprocessor 31 controls the F and R fan driving portions 33 and 34 and a compressor 32, thereby controlling the overall operation in the refrigerator.

A rotary blade position sensor 37 senses the stop angle (θ) of the rotary blade 20 according to the change in the location of a rotary blade 20 to provide data required for more precisely controlling the stop angle of the rotary blade 20. A rotary blade position controlling portion 36 is for controlling the rotary blade 20.

Figure 11:
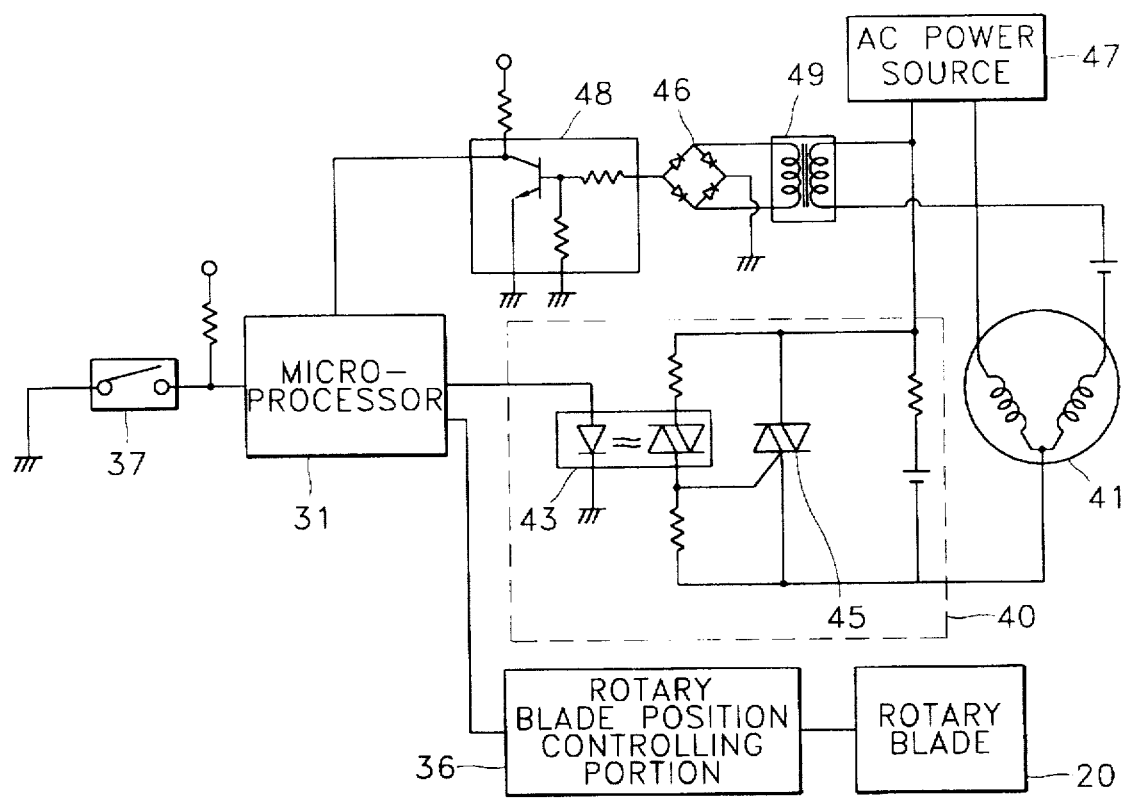
FIG. 11 is a partial circuit diagram of the temperature controlling apparatus shown in FIG. 10.

FIG. 11 is a partial circuit diagram of a temperature controlling apparatus for carrying out the method for controlling the rotation velocity of the ventilation fan and the stop angle of the rotary blade according to the present invention. The temperature controlling apparatus includes a driving motor 41, an AC power source 47 for providing an AC voltage applied to the driving motor 41, a transformer 49 for converting the voltage from the AC power source 47 into a small signal capable of being detected by the microprocessor 31, a voltage waveform cutting portion 40 and the rotary blade position controlling portion 36. An R-fan velocity sensor 39 senses the rotation velocity of the ventilation fan 30 (see FIG. 2) by checking the change in location of it to provide data required for precisely controlling the velocity of the ventilation fan 30.

The microprocessor 31 has a fuzzy inference portion and a neural network portion to calculate an temperature-equilibrating position on the basis of temperatures measured by the temperature sensors 11 and 12 and control the rotation velocity of the ventilation fan and the stop angle of the rotary blade according to the calculated position. To provide cool air to the calculated position, the rotation velocity of the ventilation fan is set according to the distance from the rotary blade to the calculated position and the stop angle of the rotary blade is set according to the calculated position.

Figure 12:
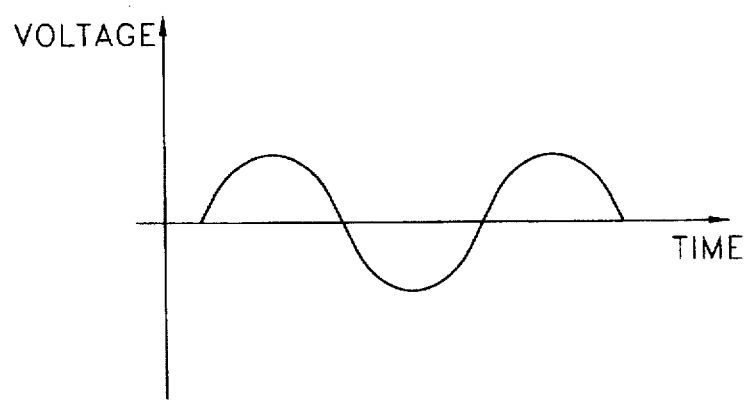
FIG. 12 is a graph showing the waveform of an alternating current (AC) power voltage.

The AC power source 47 provides the power required for rotating the ventilation fan 30 shown in FIG. 2. The voltage provided from the AC power source 47 is for rotating the ventilation fan 30 at the maximum velocity, which has a sinusoidal waveform as shown in FIG. 12. The voltage waveform cutting portion 40 shuts off a predetermined duration of the voltage waveform to control the effective value of the voltage applied to the driving motor 41, thereby controlling the rotation velocity of the ventilation fan 30. The process for controlling the rotation velocity of the ventilation fan 30 is as follows.

The voltage from the AC power source 47 is down-converted to a predetermined level via the transformer 49 to enable detection by the microprocessor 31. That is, the output voltage of the transformer 49 is in the magnitude of several volts. The voltage goes through a full-wave rectification by a bridge circuit 46 and then is applied to the microprocessor 31 via a transistor amplifier 48. The microprocessor 31 detects a zero crossing point from the waveform of the full-wave rectified voltage. Thus, the microprocessor 31 functions as a zero crossing detector 38 (see FIG. 10). The fuzzy inference portion of the microprocessor 31 outputs a temperature-equilibrating position having the highest temperature in the refrigeration compartment, into which cool air is discharged for temperature equilibrium, according to the above final formula inferred bas ed on the temperatures sensed by the temperature sensors 11 and 12. The microprocessor 31 calculates the effective value of the voltage to be applied to the driving motor 41 for rotating the ventilation fan 30 at the temperature-equilibrating velocity which indicates the rotation velocity of the ventilation fan required for providing the cool air to reach the temperature-equilibrating position The rotary blade position control portion 36 controls the stop angle (θ) of the rotary blade according to the temperature-equilibrating position inferred from the microprocessor 31.

FIG. 12 is a graph showing the waveform of the AC power voltage. In order to generate a voltage having the calculated effective value, a predetermined duration of the waveform shown in FIG. 12 is cut by the voltage waveform cutting portion 40. The voltage waveform cutting portion 40 includes an optical TRIAC 43 and a TRIAC 45. The TRIAC 45 is connected to the AC power source 47 and the driving motor 41 in series and receives the output from the optical TRIAC 43 as a gate signal. The optical TRIAC 43 generates the gate signal to be output to the TRIAC 45 by a trigger signal from the microprocessor 31.

Figure 13:
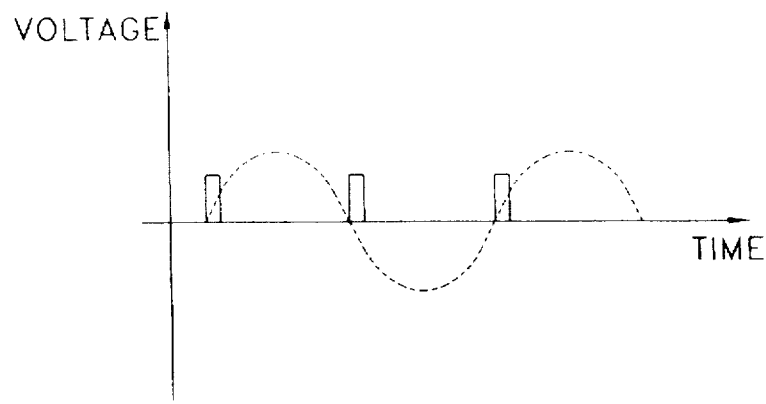
FIG. 13 is a graph showing the output waveform of zero crossing points detected by a zero crossing point detector.
Figure 14:
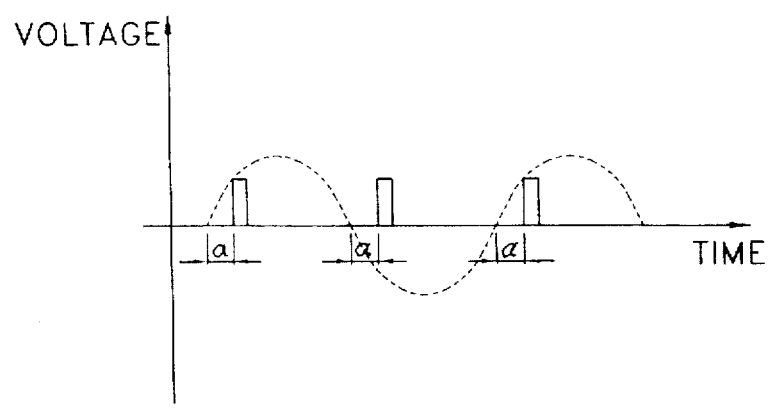
FIG. 14 is a graph showing a trigger signal, which is delayed by a predetermined duration ($\alpha$) from that of the waveforms of FIG. 13, generated by a microprocessor.
Figure 15:
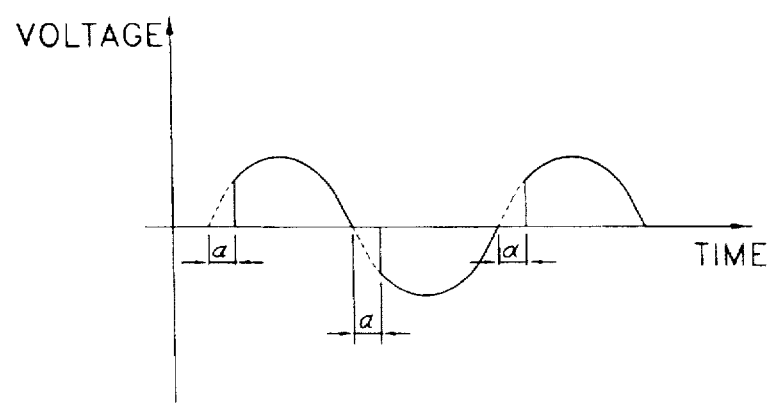
FIG. 15 is a graph showing the AC waveform cut off for a predetermined duration ($\alpha$), which is to be applied to an R-fan driving motor.

The microprocessor 31 determines a predetermined duration of the waveform to be cut from the detected zero crossing point and provides the optical TRIAC 45 with the trigger signal after a lapse of time corresponding to the cut duration. FIG. 13 is a graph showing the output waveform of zero voltage (i.e. zero crossing point) detected by the zero crossing point detector 38 (see FIG. 10). FIG. 14 is a graph showing the trigger signal generated from the microprocessor 31 after a predetermined time ($\alpha$) is delayed from the zero crossing point of the waveform of FIG. 13. The AC voltage applied to the TRIAC 45 is cut by the duration $\alpha$ from the zero crossing point as shown in FIG. 15, so that the effective value of the voltage applied to the driving motor 41 is decreased. Accordingly, the rotation velocity of the ventilation fan is decreased. As the equilibrium velocity calculated by the microprocessor 31 is low, the cut duration $\alpha$ is further increased. On the contrary, as the equilibrium velocity is high, the cut duration $\alpha$ is decreased, thereby increasing the rotation velocity of the driving motor 41. The rotation velocity of the ventilation fan is controlled as above.

The rotary blade position sensor 37 detects the angular position signals of the rotary blades for every rotation thereof and then transmits the detected angular position signals to the microprocessor 31. The microprocessor 31 detects a change in the position of the rotary blade to calculate the real stop angle of the rotary blade, and then compares the calculated real stop angle with the "temperature-equilibrating angle" by which cool air can be discharged to the temperature-equilibrating position. If the real stop angle of the rotary blade is equal to the temperature-equilibrating angle, the stop angle of the rotary blade is maintained at the temperature-equilibrating angle. Otherwise, the difference between the real stop angle and the temperature-equilibrating angle is reflected to the control for the direction of the rotary blade.

As described above, in the temperature controlling method and apparatus for the refrigerator according to the present invention, temperatures of each portion are accurately inferred from a fuzzy model using the values of temperatures sensed by only a small number of temperature sensors and then the rotation velocity of the ventilation fan and the stop angle of the rotary blade are appropriately controlled according to the portion having the highest temperature into which the cool air is to be discharged. As a result, the cool air is appropriately discharged into each portion according to the distance between the rotary blade and a target position, so that the optimal temperature equilibrium is reached evenly throughout the refrigeration compartment.

What is claimed is:

1. A temperature controlling method for a refrigerator comprising the steps of:
    (a) detecting a temperature-equilibrating position as the highest temperature position within a refrigeration compartment;
    (b) controlling the rotation velocity of a ventilation fan to a temperature-equilibrating velocity required for ventilating cool air from a rotary blade to the temperature-equilibrating position; and
    (c) controlling a stop angle of the rotary blade to orientate the cool air toward the temperature-equilibrating position.

2. A temperature controlling method as claimed in claim 1, wherein the step (a) comprises the steps of:
    (a-1) constructing a fuzzy model for inferring the temperature-equilibrating position according to the Takagi-Sugeno-Kang (TSK) fuzzy inference;

(a-2) correcting the temperature-equilibrating position inferred in the step (a-1) through the learning of a neural network.

3. A temperature controlling method as claimed in claim 2, wherein the step (a-1) comprises the steps of:

(a-1-1) obtaining data representing the changes in temperature in a plurality of portions, separated from the rotary blade by different distances at each different stop angles of the rotary blade, within the refrigeration compartment, measured by temperature sensors;

(a-1-2) performing a fuzzy division based on the measured temperature data;

(a-1-3) selecting the optimum structure among each structure obtained through the fuzzy division; and (a-1-4) calculating a linear formula for inferring the temperature-equilibrating position based on the optimum structure.

4. A temperature controlling method as claimed in claim 2, wherein the step (a-2) comprises the steps of:

(a-2-1) constituting the neural network taking the values of the measured temperature data at its input nodes and outputting the temperature-equilibrating position at its output node;

(a-2-2) performing learning of the neural network using the values of the temperature data and the temperature-equilibrating position output in the step (a-2-1); and (a-2-3) correcting the inferred temperature-equilibrating position by comparing the values of the temperature data with the temperature-equilibrating position obtained through the learning of the neural network.

5. A temperature controlling method as claimed in claim 4, wherein the step (a-2-2) comprises the step of:

reflecting the difference between a temperature-equilibrating velocity calculated from the inferred temperature-equilibrating position and a real temperature-equilibrating velocity with respect to the same input values to the neural network.

6. A temperature controlling method as claimed in claim 1, wherein the step (b) comprises the steps of:

(b-1) generating an AC voltage having an effective voltage value corresponding to the maximum rotation velocity of the ventilation fan;

(b-2) calculating an equilibrium voltage having an effective voltage value required for rotating the ventilation fan with a rotation velocity corresponding to the temperature-equilibrating velocity;

(b-3) cutting the waveform of the AC voltage by a predetermined duration to generate the equilibrium voltage; and (b-4) applying the equilibrium voltage to a driving motor for driving the ventilation fan.

7. A temperature controlling method as claimed in claim 6, wherein the step (b-1) comprises the steps of:

(b-1-1) detecting the real rotation velocity of the ventilation fan;

(b-1-2) calculating the difference between the detected rotation velocity of the ventilation fan and the temperature-equilibrating velocity; and (b-1-3) calculating an effective voltage value corresponding to the temperature-equilibrating velocity by adding or subtracting an effective voltage value corresponding to the velocity difference to or from the effective voltage value corresponding to the detected rotation velocity of the ventilation fan.

8. A temperature controlling method as claimed in claim 6, wherein the step (b-3) comprises the steps of:

(b-3-1) detecting a zero crossing point from the waveform of the AC voltage;

(b-3-2) calculating a delay time from the zero crossing point, corresponding to an effective voltage value obtained by subtracting the effective voltage value corresponding to the temperature-equilibrating velocity from the effective voltage value of the AC voltage waveform; and (b-3-3) cutting the waveform during the delay time calculated in the step (b-3-2) from the zero crossing point.

9. A temperature controlling method as claimed in claim 1, wherein the step (c) comprises the steps of:

(c-1) detecting the stop angle of the rotary blade;

(c-2) calculating the difference between the stop angle of the rotary blade and the inferred temperature-equilibrating angle; and (c-3) tuning the stop angle of the rotary blade by reflecting the difference calculated in the step (c-2) to the detected stop angle of the rotary blade.

10. A temperature controlling apparatus for a refrigerator having a rotary blade, at least one evaporator, and at least two ventilation fans each of which is installed in a freezer compartment and a refrigeration compartment, the temperature controlling apparatus comprising:

means for sensing change in temperatures at a predetermined number of portions within the refrigeration compartment;

means for performing a fuzzy inference according to the temperature changes sensed by the temperature sensing means to infer a temperature-equilibrating position corresponding to the highest temperature position;

neural network calculating means for calculating the temperature-equilibrating position by taking the temperature change values sensed by the temperature sensing means at its input nodes, and outputting the calculated temperature-equilibrating position at its output node;

means for performing learning of the neural network by reflecting the difference between a temperature-equilibrating velocity of the refrigeration ventilation fan (R-fan), required for discharging the cool air to the temperature-equilibrating position, and the real rotation velocity of the R-fan, into the neural network calculating means;

a rotation velocity controller for controlling the rotation velocity of the R-fan according to the temperature-equilibrating velocity; and a stop angle controller for controlling a stop angle of the rotary blade to the temperature-equilibrating angle for discharging the cool air into the temperature-equilibrating position.

11. A temperature controlling apparatus as claimed in claim 10, wherein the rotation velocity controller comprises:

a power source for providing an AC voltage having an effective value corresponding to the maximum rotation velocity of the R-fan;

a temperature-equilibrium voltage generator for generating a temperature-equilibrium voltage having an effective voltage value corresponding to the temperature-equilibrating velocity by cutting the AC voltage by a predetermined duration; and a driving motor for driving the R-fan according to the temperature-equilibrium voltage.

12. A temperature controlling apparatus as claimed in claim 10, wherein the temperature-equilibrium voltage generator comprises:

a zero crossing point detector for detecting a zero crossing point from the AC voltage;

a delay time calculator for calculating a delay time from the zero crossing point to generate the temperature-equilibrium voltage; and waveform cutting means for cutting the waveform of the AC voltage from the zero crossing point during the delay time.

13. A temperature controlling apparatus as claimed in claim 12, wherein the waveform cutting means comprises:

a TRIAC connected to the power source together with the driving motor; and trigger means for providing a trigger signal to a gate port of the TRIAC after a lapse of time corresponding to the cut duration.

14. A temperature controlling apparatus as claimed in claim 10, wherein the rotation velocity controller comprises:

means for detecting the rotation velocity of the R-fan; and means for calculating the difference between the detected rotation velocity of the R-fan and the inferred temperature-equilibrating velocity, wherein a temperature-equilibrating velocity is obtained by reflecting the calculated velocity difference to the inferred temperature-equilibrating velocity, and the rotation velocity of the R-fan is controlled to the obtained temperature-equilibrating velocity.

15. A temperature controlling apparatus as claimed in claim 10, wherein the stop angle controller comprises:

means for detecting the stop angle of the rotary blade; and means for calculating the difference between the detected stop angle of the rotary blade and the inferred temperature-equilibrating angle, wherein a temperature-equilibrating angle is obtained by reflecting the calculated angle difference to the detected stop angle, and the stop angle of the rotary blade is controlled to the obtained temperature-equilibrating angle.

* * * * *